3,255,025
METHOD OF PRODUCING A GEL
Charles Edward Oxley, Warrington, England, assignor to Unilever Limited, Port Sunlight, England, a company of Great Britain
No Drawing. Filed Aug. 29, 1962, Ser. No. 220,149
Claims priority, application Great Britain, Aug. 8, 1962, 30,353/62
6 Claims. (Cl. 106—38.35)

This invention relates to a method of producing a gel, more particularly a gel suitable for use as a binder for refractory powder.

According to the invention there is provided a method of producing a gel suitable for use as a binder for refractory powder in which there is hydrolysed a liquid composition comprising a mixture of an organic titanium ester of the formula $Ti(OR)_4$ where R is an alkyl group containing 2 to 6 carbon atoms, and an aminoalcohol of the formula $N(R^1)(R^2)(R^3)$ where $R^1$ and $R^2$ represent hydrogen, a straight chain hydroxyalkyl group having 2 to 5 carbon atoms, a branched chain polyhydroxyalkyl group having 4 or 5 carbon atoms, or an alkyl group having 1 to 5 carbon atoms, and $R^3$ represents a straight chain hydroxyalkyl group having 2 to 5 carbon atoms or a branched chain polyhydroxyalkyl group having 4 or 5 carbon atoms, and the groups $R^1$, $R^2$ and $R^3$ have an aggregate of at least 3 carbon atoms, the amount of the aminoalcohol being at least $1/n$ moles per mole of the titanium ester where $n$ is the number of hydroxyl groups in the groups $R^1$, $R^2$ and $R^3$.

Examples of suitable aminoalcohols are N methyl ethanolamine, diethanolamine, triethanolamine and 2-amino-2-ethyl propan-1,3 diol. The preferred titanium ester is n-butyl orthotitanate.

A coherent gel having binding properties can be produced from the above liquid compositions by mixing them with a solution of water in a mutual solvent for water, the ester and aminoalcohol, and then allowing the mixture to set to a gel. In some cases a solvent is not essential and the addition of water alone can cause gel formation. In those cases where a solvent is essential the water must be in a sufficient degree of dilution or otherwise no coherent gel will be formed. The amount of solvent required in order that a coherent gel may be produced is dependent on the aminoalcohol employed. Simple trial will determine suitable concentrations of water for coherent gel formation in any particular instance. The liquid composition will form a coherent gel in a time dependent on the molar proportion of the aminoalcohol relative to that of the titanium ester and on the amount of water added. When a solvent is used the gel time will also be dependent on the concentration of the water in the solvent. Suitable mutual solvents for the water, ester and aminoalcohol are the lower aliphatic alcohols, for example methanol, ethanol, normal propanol and isopropanol. If desired, some solvent may be included in the mixture of titanium ester and aminoalcohol.

Gels produced in accordance with the invention may be used to bind refractory powder in the manufacture of refractory articles such as crucibles and moulds for the casting of high melting point metals and alloys. Parts of moulds and cores, which are subsequently assembled to give a complete mould for casting metals or alloys, can also be produced. The gels produced are particularly valuable as binders for refractory material in the manufacture of crucibles for the melting of metals and alloys.

To make refractory articles, the liquid composition comprising an organic titanium ester and aminoalcohol are mixed with water or a solution of water in a mutual solvent for water, the aminoalcohol and the ester, so as to cause the formation of a gel, refractory powder is added to the liquid mixture prior to gel formation, the resultant mixture is formed into the desired shape, gel formation is allowed to occur and the shape allowed to harden, whereafter the hardened shape is fired. Preferred refractories are zircon and alumina.

The following examples illustrate the invention. All parts are by weight.

*Example 1*

1 part of butyl orthotitanate (1 mol) and 1 part of N methyl ethanolamine (4.5 mols) were mixed. To 10 g. of this mixture were slowly added 4 ml. of a 20% (w./w.) solution of water in isopropanol. During the addition, the mixture of titanium ester and aminoalcohol was vigorously stirred. A gel was produced in about 5 minutes.

*Example 2*

4 parts of butyl orthotitanate (1 mol) and 1 part of triethanolamine (0.57 mol) were mixed. To 10 g. of this mixture were slowly added 4 ml. of a 60% (w./w.) solution of water in isopropanol. During the addition, the mixture of titanium ester and aminoalcohol was vigorously stirred. A gel was produced in about 5 minutes.

*Example 3*

4 parts of butyl orthotitanate (1 mol) and 1 part of 2-amino-2-ethyl-propan-1,3-diol (0.7 mol) were mixed. To 10 g. of this mixture were slowly added 1.5 ml. of a 60% (w./w.) solution of water in isopropanol. During the addition, the mixture of titanium ester and aminoalcohol was vigorously stirred. A gel was produced in about 5 minutes.

*Example 4*

3 parts of butyl orthotitanate (1 mol) and 1 part of diethanolamine (1.1 mol) were mixed. To 25 g. of this mixture were added slowly with stirring 5 ml. of water. During the addition, the mixture of titanium ester and aminoalcohol was vigorously stirred. A gel was produced.

*Example 5*

A mixture was prepared of 3 parts of butyly orthotitanate and 1 part of diethanolamine. To 25 g. of the mixture were added slowly with stirring 5 ml. of water. 120 g. of sillimanite powder were then added to form a slurry. This slurry was poured into a crucible mould and the moulding removed after 1 to 1½ hours. The moulding was hardened by being allowed to stand in air overnight and was then fired at 1000° C. for 2 hours to give a hard crucible.

What is claimed is:

1. A method of making refractory articles comprising adding a refractory powder to a liquid composition consisting essentially of a mixture of an organic titanium ester of the formula $Ti(OR)_4$ where R is an alkyl group containing 2 to 6 carbon atoms, and an aminoalcohol of the formula $N(R^1)(R^2)(R^3)$ where $R^1$ and $R^2$ are groups selected from the class consisting of hydrogen, straight chain hydroxyalkyl groups having 2 to 5 carbon atoms, branched chain polyhydroxyalkyl groups having 4 to 5 carbon atoms and alkyl groups having 1 to 5 carbon atoms, and $R^3$ represents a group selected from the class consisting of straight chain hydroxyalkyl groups having 2 to 5 carbon atoms and branched chain polyhydroxyalkyl groups having 4 to 5 carbon atoms, and the group $R^1$, $R^2$ and $R^3$ have an aggregate of at least 3 carbon atoms, the amount of the aminoalcohol being at least $1/n$ moles per mole of the titanium ester where $n$ is the number of the hydroxyl groups in $R^1$, $R^2$ and $R^3$; forming the resultant mixture into an article having a desired shape; hydrolyzing said mixture to form a gel; and then firing the hardened article.

2. A method as claimed in claim 1 wherein the said mixture is hydrolyzed with water.

3. A method as claimed in claim 1 wherein said mixture is hydrolyzed with water containing a lower aliphatic alcohol having 1 to 3 carbon atoms.

4. A method as claimed in claim 1 wherein the titanium ester is n-butyl orthotitanate.

5. A method as claimed in claim 1 wherein the aminoalcohol is diethanolamine.

6. A method as claimed in claim 1 wherein the aminoalcohol is triethanolamine.

References Cited by the Examiner

UNITED STATES PATENTS

| | | | |
|---|---|---|---|
| 2,160,273 | 5/1939 | Loane et al. | 260—429.5 XR |
| 2,187,821 | 1/1940 | Nelles | 260—429.5 |
| 2,852,399 | 9/1958 | Bellezanne | 106—38.22 |
| 3,014,826 | 12/1961 | Kohn et al. | 154—43 |
| 3,056,818 | 10/1962 | Werber | 260—410.6 |

ALEXANDER H. BRODMERKEL, *Primary Examiner.*

J. B. EVANS, *Assistant Examiner.*